(12) United States Patent
McEnaney et al.

(10) Patent No.: US 10,479,693 B2
(45) Date of Patent: Nov. 19, 2019

(54) ELECTRO-THERMOCHEMICAL LI CYCLING FOR NH3 SYNTHESIS FROM N2 AND H2O

(71) Applicant: The Board of Trustees of the Leland Stanford Junior University, Palo Alto, CA (US)

(72) Inventors: Joshua M. McEnaney, East Palo Alto, CA (US); John Schwalbe, Palo Alto, CA (US); Aayush Ranjan Singh, Palo Alto, CA (US); John Lin, Stanford, CA (US); Jakob Kibsgaard, Copenhagen O (DK); Thomas F. Jaramillo, Menlo Park, CA (US); Matteo Cargnello, Palo Alto, CA (US); Jens K. Nørskov, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 5 days.

(21) Appl. No.: 15/664,240

(22) Filed: Jul. 31, 2017

(65) Prior Publication Data
US 2018/0029895 A1    Feb. 1, 2018

Related U.S. Application Data

(60) Provisional application No. 62/369,517, filed on Aug. 1, 2016.

(51) Int. Cl.
C25B 1/00    (2006.01)
C25B 9/06    (2006.01)
(Continued)

(52) U.S. Cl.
CPC .............. *C01C 1/04* (2013.01); *B01J 19/24* (2013.01); *C25C 3/02* (2013.01); *C25C 7/005* (2013.01); *C25C 7/06* (2013.01); *B01J 2219/24* (2013.01)

(58) Field of Classification Search
CPC .... C25B 1/00; C25B 9/06; C25B 9/08; C25B 11/035; C25B 3/02; C25B 3/04;
(Continued)

(56) References Cited

U.S. PATENT DOCUMENTS

| | | | |
|---|---|---|---|
| 2006/0049063 A1* | 3/2006 | Murphy | C25B 1/00 205/552 |
| 2008/0149493 A1* | 6/2008 | Friesen | C25B 1/00 205/337 |
| 2016/0194767 A1* | 7/2016 | Mulder | C25B 11/04 205/338 |

* cited by examiner

*Primary Examiner* — Zulmariam Mendez
(74) *Attorney, Agent, or Firm* — Lumen Patent Firm

(57) ABSTRACT

An electro-thermochemical cycling system for producing ammonia is provided that includes a reaction chamber having a metal compound input port, an anode suitable for oxidation in contact with the metal compound and configured for oxidation of hydroxide ions to water and oxygen, a cathode suitable for plating in contact with the metal compound and configured to electrolyze the metal compound to metal, a voltage source connecting the cathode and anode, a nitrogen port to the reaction chamber that combines nitrogen with the electrolyzed metal on the cathode to form a metal-nitrogen compound proximal to the nitrogen input, an atomic hydrogen port to the reaction chamber that combines with the metal-nitrogen compound to form ammonia, and an ammonia output port from the reaction chamber, where a metal compound input port inputs the metal compound to the reaction chamber according to a depletion rate of the metal compound in the reaction chamber.

11 Claims, 4 Drawing Sheets

(51) Int. Cl.
*C25B 9/08* (2006.01)
*C25B 3/04* (2006.01)
*C25C 7/00* (2006.01)
*C25C 7/02* (2006.01)
*C01C 1/04* (2006.01)
*C25C 3/02* (2006.01)
*C25C 7/06* (2006.01)
*B01J 19/24* (2006.01)

(58) Field of Classification Search
CPC .... C25C 7/00; C25C 5/02; C25C 1/00; C25C 7/005; C25C 7/02
USPC .......................................................... 205/552
See application file for complete search history.

ELECTRO-THERMOCHEMICAL LI CYCLING FOR NH3 SYNTHESIS FROM N2 AND H2O

CROSS-REFERENCE TO RELATED APPLICATIONS

This application claims priority from U.S. Provisional Patent Application 62/369,517 filed Aug. 1, 2016, which is incorporated herein by reference.

FIELD OF THE INVENTION

The present invention relates generally to ammonia production. More particularly, the invention relates to a method of and device for producing ammonia from water and atmospheric nitrogen under mild conditions.

BACKGROUND OF THE INVENTION

The development of a sustainable route to ammonia production is one of the largest challenges in chemistry. The world's ammonia-based fertilizer is predominantly supplied by the industrial Haber-Bosch process and by the enzymatic nitrogenase process. These two processes are very different. Nitrogenase reduces $N_2$ molecules at ambient conditions using high energy electrons released though the hydrolysis of 16 ATP molecules. The Haber Bosch process, on the other hand, uses $H_2$ molecules with an iron-based catalyst at high temperature (400-500° C.) and high pressure (150-250 bar), conditions, which generally require centralized production. This process alone produces over 150 million metric tons of ammonia each year and consumes over 1% of the entire global energy supply. Due to the use of hydrocarbon reforming to produce the required hydrogen, it also results in the release of over 450 million metric tons of $CO_2$ annually. It would be desirable to develop an alternative, sustainable process capable of employing renewable resources rather than fossil fuels to produce fertilizer locally where it is used.

To this end, attempts have been made to mimic the enzymatic process with molecular complexes, achieving high selectivity under strongly reducing conditions, however the stability of these catalysts is a challenge. Many photochemical and electrochemical routes to ammonia from $N_2$ and $H_2O$ using heterogeneous catalysts have been explored. $NH_3$ production and current efficiencies are usually below 1% due to the exceptional stability of the $N_2$ triple bond and due to competition with the hydrogen evolution reaction (HER). Experimentally, some progress has been made by moving to molten salt systems, which have allowed for higher selectivity of ammonia over hydrogen evolution. Fundamentally, however, it remains a challenge to provide protons and electrons at high enough chemical potential to reduce nitrogen without producing substantial amounts of $H_2$.

What is needed is a method and device that provides a lower impact alternative to the industrial standard Haber-Bosch. A method and device that can operate at lower pressure and that can use water rather than hydrogen gas as the hydrogen source to reduce fossil fuel demands to enable localized and sustainable production of ammonia.

SUMMARY OF THE INVENTION

To address the needs in the art, an electro-thermochemical cycling system for producing ammonia is provided that includes a reaction chamber having a metal compound input port, where a metal compound is input to the reaction chamber through the metal compound input port, an anode suitable for oxidation, where the anode is in contact with the metal compound, where the anode is configured for oxidation of anions, a cathode that is suitable for plating, where the cathode is configured to electrolyze the metal compound to metal, a voltage source, where the voltage source connects the cathode to the anode, a nitrogen port to the reaction chamber containing the electrolyzed metal, where nitrogen from the nitrogen port combines with the electrolyzed metal to form a metal-nitrogen compound proximal to the nitrogen input, an atomic hydrogen port to the reaction chamber containing the metal-nitrogen compound, where atomic hydrogen from the atomic hydrogen port combines with the metal-nitrogen compound to form ammonia, and an ammonia output port from the reaction chamber containing the ammonia, were the metal compound input port is configured to input the metal compound to the reaction chamber according to a depletion rate of the metal compound in the reaction chamber.

According to one aspect of the invention, the metal compound can include Li, Be, Mg, Na, Mo, Al, Zn, Ca, Sr, or Ba. Here, the anode or the cathode is equipped with solid or porous alumina, magnesia, or steel structures, where the alumina, magnesia, or steel structures are configured to hold produced molten Li, where the solid or porous alumina or steel structures are configured to separate and direct $H_2O$ and $O_2$ produced gas.

In another aspect of the invention, the reaction chamber is divided into separate reaction chambers that include the reaction chamber containing said electrolyzed metal, the reaction chamber containing the metal-nitrogen compound, and the reaction chamber containing the ammonia.

In another aspect of the invention, the cathode can include steel, Ni, Cu, Ti, Mo, or graphite.

According to one aspect of the invention, the anode can include steel, Ni, Pt, W, metal alloys, metal oxides, or graphite.

In yet another aspect of the invention, the metal compound includes a molten metal compound and an additive for reducing the melting point of the molten metal compound mixture, reducing the melting point of the molten metal compound and dissolving the metal compound, or dissolving the metal compound contained in the reaction chamber. Here, the additive includes LiCl, KCl, CsCl, RbCl, LiI or alkali earth metal compounds for decreased melting point and/or removing hydrogen, oxygen, or hydroxide sources from the cathode.

In a further aspect of the invention, the atomic hydrogen can include water, ethanol, hydrogen, or HCl.

In yet another aspect of the invention, the anode oxidation source can include OH, Cl, Br, I, or F.

In another aspect of the invention, the reaction chamber further includes a diffusion barrier disposed between the anode and the cathode. Here, the reaction chamber includes a cylindrical reaction chamber that is divided into three sub-chambers, where the anode and the cathode are separated by the diffusion barrier, where the three sub-chambers rotate about a central axis of the cylindrical reaction chamber, where the ammonia output port is positioned on a sidewall of the cylindrical reaction chamber.

DETAILED DESCRIPTION

Figure 1:
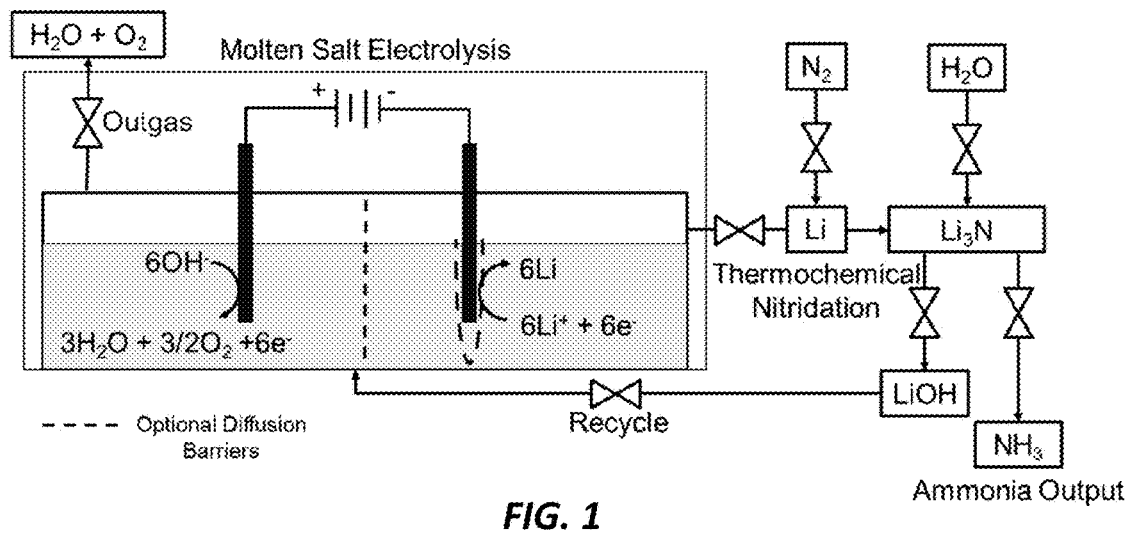
FIG. 1 shows a schematic drawing of an electro-thermochemical $NH_3$ synthesis device operating with molten salt electrolysis, according to one embodiment of the invention.

The current invention reduces the capital investment required for ammonia production. There is a substantial market for ammonia (over 100 million tons/yr) and it is projected to grow with population. It is used for the production of fertilizers, as an energy storage chemical or fuel, and in the production of other nitrogen based industrial chemicals such as hydrazine, nitrous oxide and nitric acid. The Haber-Bosch process is the current industrial standard and requires over 1% of the entire global energy supply and 3-5% of the natural gas supply for pre-requisite hydrogen production. The high pressures and temperatures used in this process require large, centralized plants. The current invention is a lower impact alternative to the industrial standard Haber-Bosch and provides several cost competitive advantages. The current invention uses water rather than hydrogen gas as the hydrogen source and will therefore reduce hydrogen gas and fossil fuel demands for any application. The process by the current invention operates at significantly lower pressures than the Haber-Bosch, requiring lower equipment and operating costs. These reduced processing demands enable localized production of ammonia, which can mitigate distribution costs. The current invention can be integrated with fertilization and irrigation techniques as well as modern "fertigation" systems to apply nitrogen fertilizer more intelligently and with less waste. Additionally, the current invention can promote ammonia as a high quality, readily available, clean burning fuel or chemical energy storage molecule.

More specifically, an electro-thermochemical cycling system for producing ammonia is provided that includes a reaction chamber having a metal compound input port, where a metal compound is input to the reaction chamber through the metal compound input port, an anode suitable for oxidation, where the anode is in contact with the metal compound, where the anode is configured for oxidation of hydroxide ions to water and oxygen, a cathode that is suitable for plating, where the cathode is in contact with the metal compound, where the cathode is configured to electrolyze the metal compound to metal, a voltage source, where the voltage source connects the cathode to the anode, a nitrogen port to the reaction chamber containing the electrolyzed metal, where nitrogen from the nitrogen port combines with the electrolyzed metal on the cathode to form a metal-nitrogen compound proximal to the nitrogen input, an atomic hydrogen port to the reaction chamber containing the metal-nitrogen compound, where atomic hydrogen from the atomic hydrogen port combines with the metal-nitrogen compound to form ammonia, and an ammonia output port from the reaction chamber containing the ammonia, where the metal compound input port is configured to input the metal compound to the reaction chamber according to a depletion rate of the metal compound in the reaction chamber.

The electro-thermochemical cycling process can be divided into steps, which may be run as such, or run continuously. This process may vary depending on the chemicals, materials, and conditions chosen, and may start from any point in such a cycle, but an example cycle is outlined as follows. The first step is the reduction of a metal compound such as a metal salt. According to one aspect of the invention, the metal compound can include Li, Be, Mg, Na, Mo, Al, Zn, Ca, Sr, or Ba. Here, the anode or the cathode can be equipped with solid or porous alumina, magnesia, or steel structures, where the porous alumina, magnesia, or steel structures are configured to hold produced molten Li, where the porous alumina or steel mesh are configured to separate and direct H$_2$O and O$_2$ produced gas. In one example, molten LiOH, (or alkali earth metal hydroxides including Be, Mg, Ca, Sr, and Ba), which may or may not be in a metal compound mixture electrolyte, is electrolyzed to form Li metal, water, and oxygen, according to this example. This is shown as the overall reaction (Equation 1) and as each half reaction at the cathode (Equation 2) and the anode (Equation 3) respectively.

Step 1:

$$6LiOH \rightarrow 6Li + 3H_2O + 3/2O_{2(g)} \qquad \text{Equation 1}$$

$$6Li^+ + 6e^- \rightarrow 6Li \qquad \text{Equation 2}$$

$$6OH^- \rightarrow 6H_2O + 3/2O_{2(g)} + 6e^- \qquad \text{Equation 3}$$

Here, water and oxygen should only form at the anode.

The second step will introduce N$_2$ to the Li metal to thermochemically produce Li$_3$N (Equation 4).

Step 2:

$$6Li + N_{2(g)} \rightarrow 2Li_3N_{(s)} \qquad \text{Equation 4}$$

The final step will introduce H$_2$O to the Li$_3$N in an exothermic release of NH$_3$ (Equation 5). LiOH is reproduced in this step, thus completing the cycle.

Step 3:

$$2Li_3N_{(s)} + H_2O \rightarrow 6LiOH + 2NH_3 \qquad \text{Equation 5}$$

Figure 2:
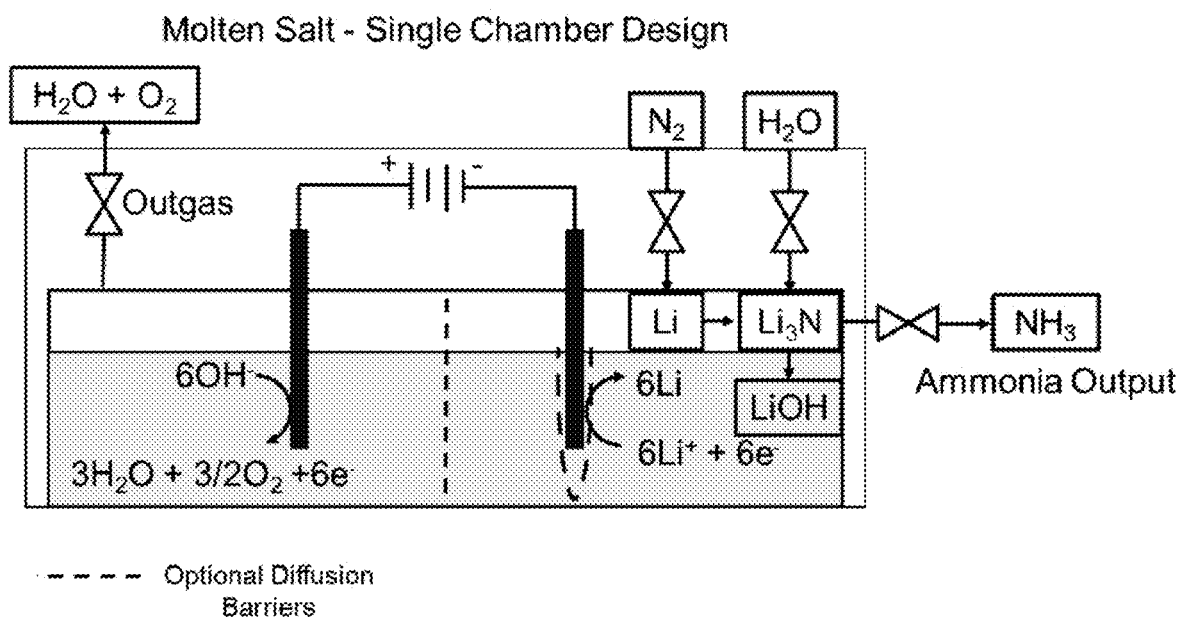
FIG. 2 shows a schematic drawing of a single chamber electro-thermochemical NH$_3$ synthesis device operating with molten salt electrolysis, according to one embodiment of the invention.

An example apparatus is described generally by the following description with example figures shown as appended drawings. In one exemplary embodiment, a reaction chamber (FIG. 1) may hold a molten salt containing LiOH and possibly other additives (i.e. the additive includes LiCl, KCl, CsCl, RbCl, LiI or alkali earth metal compounds for decreased melting point and/or removing hydrogen, oxygen, or hydroxide sources from the cathode). This chamber may possess a cathode suitable for Li plating (i.e. steel, Ni, Cu, Ti, Mo, or graphite) and an anode suitable for oxidation of hydroxide ions to water and oxygen (i.e. steel, Ni, Pt, W, metal alloys, metal oxides, or graphite). These electrodes may be solid or porous materials and may be integrated with supporting materials to aid in their functionality (i.e. porous alumina or steel mesh to contain molten Li as it is produced, to separate and direct O$_2$ produced gas, or microstructure materials to exploit surface tension and density differences to separate the metallic product from the melt). Produced Li metal will be exposed to N$_2$ to produce Li$_3$N either in the same chamber or a separate chamber (FIG. 2). Li$_3$N may then be introduced to stoichiometric or excess water to produce NH$_3$. There is at least one input for fresh salt if salt is removed in this cycle. Though, hydroxide is used in this example, the invention also works by oxidizing other anions, for example chloride to chlorine, then regenerate the chloride later.

According to other aspects of the invention, the efficiency is reduced when only LiOH is used, instead when only LiCl (and KCl) is in contact with the cathode and LiOH (and LiCl) is in contact with the anode, the device shows optimum performance. LiOH in contact with the cathode is highly detrimental to Li plating. Specifically, when LiCl is reduced to Li and LiOH is oxidized to form $O_2$ and $H_2O$, LiCl reforms in the electrolyte, so overall LiOH is electrolyzed.

In one aspect of the invention, the metal compound includes a molten metal compound and an additive for reducing the melting point of the molten metal compound mixture, reducing the melting point of the molten metal compound and dissolving the metal compound, or dissolving the metal compound contained in the reaction chamber.

In a further aspect of the invention, the additive includes LiCl, KCl, CsCl, RbCl, or LiI for decreased melting point and/or removing hydrogen or hydroxide sources from the working electrode.

Figure 3:
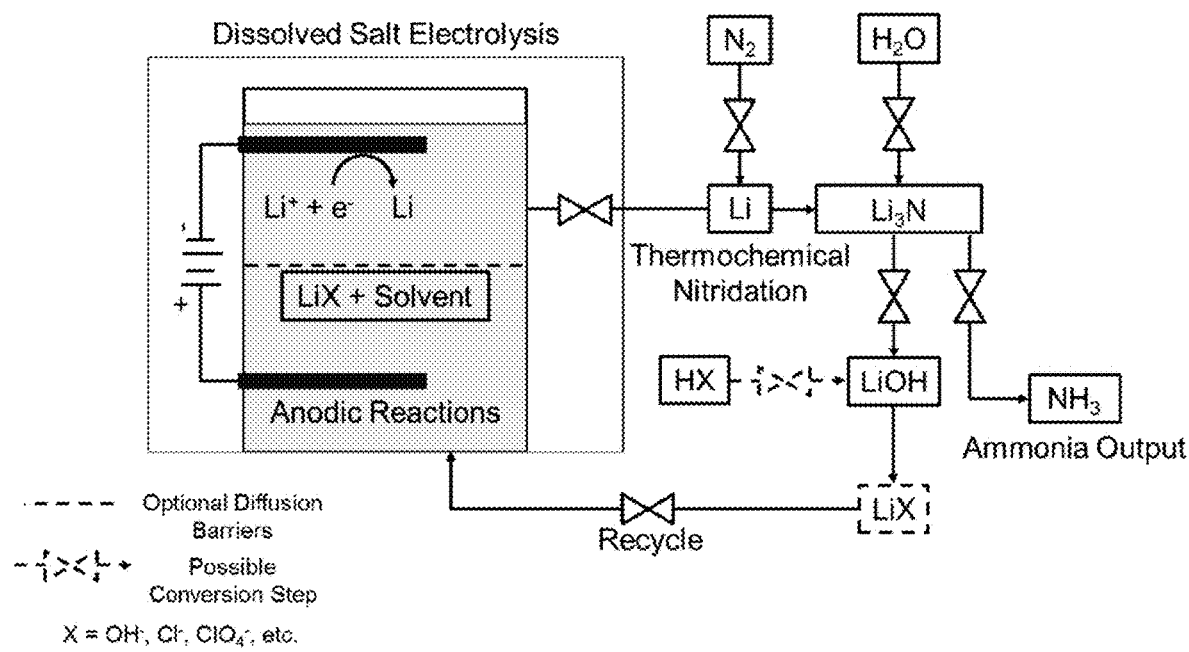
FIG. 3 shows a schematic drawing of an electro-thermochemical NH$_3$ synthesis device operating with dissolved salt electrolysis, according to one embodiment of the invention.
Figure 4:
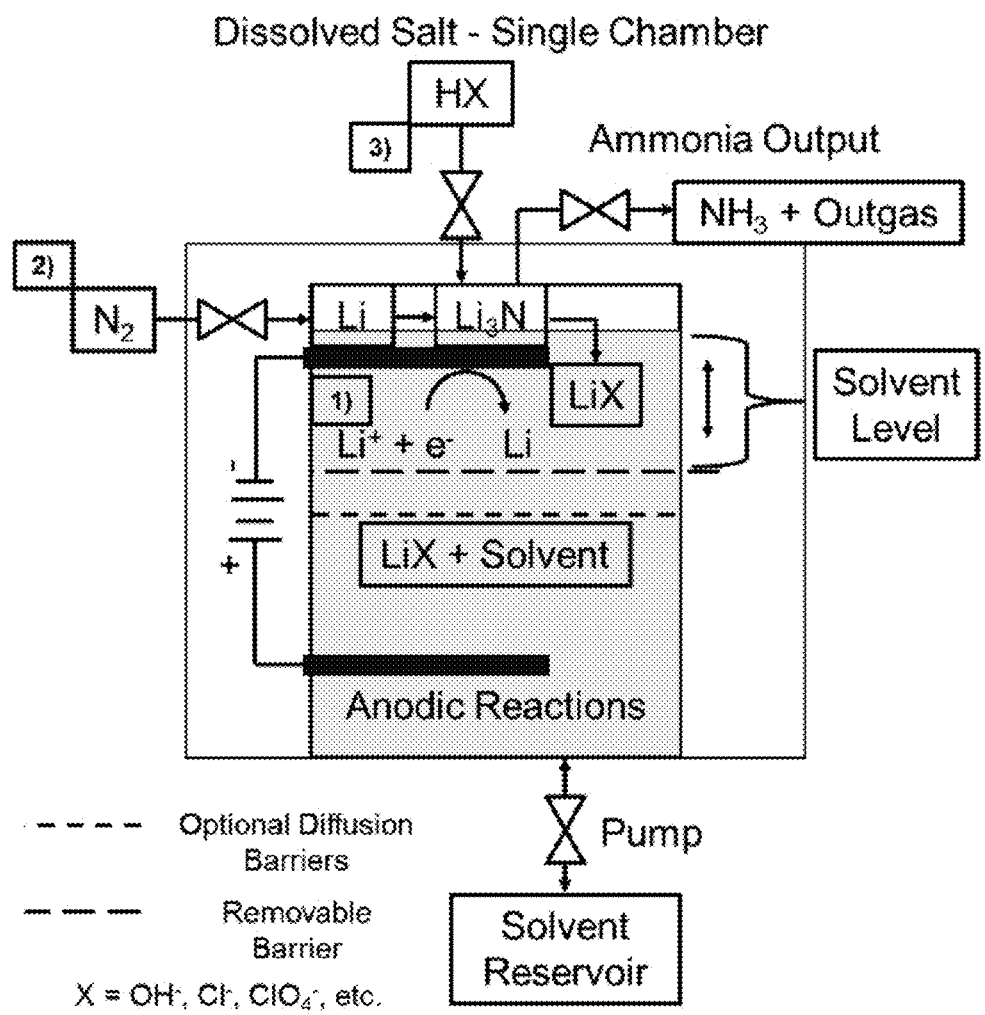
FIG. 4 shows a schematic drawing of a single chamber electro-thermochemical NH$_3$ synthesis device operating with dissolved salt electrolysis, according to one embodiment of the invention.

An alternative embodiment is provided, also using $Li_3N$ is shown in FIG. 3, where a Li salt is dissolved in a solvent (i.e. propylene carbonate, tetrahydrofuran, water, or ethanol) is reduced to Li metal and then converted to $Li_3N$. Ammonia may be produced from $Li_3N$ by a proton source such as $H_2O$ and then the resulting Li salt may be converted to the original salt if necessary to complete the cycle. A single chamber version of this is shown in FIG. 4.

Some exemplary applications include: (1) Localized or centralized ammonia production via an electro-thermocatalytic cycling process for fertilizer. (2) Applications requiring energy to be stored, e.g. renewable electricity (wind, solar, etc.). (3) Ammonia as a precursor chemical to many nitrogen containing chemicals and materials. (4) Ammonia production as a fuel alternative.

Key advantages of the invention are provided, which include (1) The reduced need for the Haber-Bosch ammonia synthesis, which requires over 1% of the entire global energy supply and 3-5% of the natural gas supply for pre-requisite hydrogen production. The process of the current invention uses water rather than molecular hydrogen as a source of atomic hydrogen and thus mitigates these resource demands. (2) The process of the current invention also operates at significantly lower pressures than the Haber-Bosch, which lowers equipment and operational costs as well. (3) The current invention allows for localized production of ammonia (mitigated distribution costs). (4) After production, the nitrogen utilization efficiency is only about 50% from atmospheric nitrogen to nitrogen uptake in fertilized crops. With local production and implementation, ammonia solutions are then directly applied to crops for fertilization, which can increase nitrogen utilization efficiencies, as well as (5) mitigate cost of fertilizer production. (6) There are $CO_2$ emissions from this process, as opposed to the conventional Haber-Bosch ammonia process.

Some exemplary variations are provided, which include: (1) Variations and additives in salt melt for control over conductivity, melting temperature, diffusion properties, and other properties. (2) Synthesis by replacing Li metal and/or salt with another metal and/or salt such as, but not limited to Li, Be, Mg, Na, Mo, Al, Zn, Ca, Sr, or Ba for a similar metal nitride cycling approach. (3) Expending the metal nitride or nitrogen incorporating species rather than completing a cycle. (4) Variations in temperature and pressure throughout the process. (5) Variations in electro-thermochemical cell design, while applying this general process, including, but not limited to the separation of the process into discrete steps and compartments. (6) LiOH may be replaced with another Li salt to produce metallic lithium and continue the ammonia production. (7) An alternative reaction may occur at the anode such as $Cl_2$ formation. (8) $H_2O$ may be replaced with another source of atomic hydrogen such as ethanol, hydrogen, or HCl. (9) $N_2$ may be replaced with another source of atomic nitrogen such as nitrates or other nitrogenous species. (10) LiH, $LiNH_2$, and other side products may be formed and subsequently converted to produce $H_2$ or $NH_3$. In another aspect of the invention, alternatives to the OH anion as the anode oxidation source can include Cl, Br, I, F, $H_2O$, or $NO_3$, where other oxidizable species can include non-ion chemicals such as $NO_3$—, NOx-, $SO_4$, Ox-, $CO_3$—, COOH—, and especially $H_2O$, etc.

Electrode materials may comprise any reasonably conductive material including alkali metals, transition metals, noble metals, metal alloys, conductive ionic compounds, conductive carbon, lithium-based battery electrodes with and without lithium intercalation capabilities, doped and otherwise altered conductive electrodes. Specific additional examples to give an idea of considerable materials include Li, $Li_3N$, Co, Pt, Au, Ag, Ru, Re, Ir, W, Mo, Cr, Pb, Sn, Al, $TiO_2$, $CrO_3$, $MoO_3$, steel, brass, NiFe, NiMo, $CoMoO_x$, $Ni_xW_yS_z$, perovskites, WC, MoN, CoP, $Zn_3N_2$ graphite, carbon black, doped silicon, surface enhanced electrodes, structured electrodes to allow for better Li or $Li_3N$ capture, coated electrodes for alkaline protection, self-regenerating catalyst electrodes. Base resistant materials will be particularly effective in molten LiOH. Some electrode materials will be more active and efficient than others. The description above teaches specific embodiments of the LiOH electrolysis, however, LiCl electrolysis or other Li salt is also possible to achieve the desired ammonia/ammonium product.

Molten electrolyte solutions can include any salt or additive that will continue to allow Li compounds to be reduced at the cathode. For example, these solutions include LiOH, LiCl, LiBr, LiI, LiF, $LiCO_3$, LiOH—LiCl, LiOH—LiCl—KCl, LiCl—KCl, LiOH—KBr, LiCl—$CaCl_2$, LiCl—KCl—CsCl, LiOH—LiCL at the anode with LiCl—KCL at the cathode, other combinations of these and similar salts, other additives to lower melting point or temperature requirements, the addition of catalyst promoter elemental and ionic additives such as K, Ca, Cs or electrode-containing ions into the electrolyte solution to regenerate or protect electrodes. In the other variations of this process, electrolyte solvents include propylene carbonate, isopropanol, ethanol, water, DMSO, acetonitrile, other common Li-ion battery solvents, ionic liquids. Polar aprotic solvents will allow for proton addition after $Li_3N$ synthesis to yield ammonia, while protic solvents may donate their protons toward hydrogen evolution and subsequent $NH_3$ production or ammonia synthesis directly. Electrolyte solutions at the anode and cathode may be different and spatially separated to satisfy chemical compatibility of electrode materials, reactants, and products, ultimately improving efficiency and product value.

In one exemplary embodiment, ammonia output from this process can be expected to be approximately 42 g $NH_3$/kWh in terms of electricity cost based on a lenient 600 mV required overpotential and 80% current efficiency, however this yield can be improved with adjustments that are within the scope of this disclosure. At low electricity costs or high natural gas/carbon tax costs this becomes cost competitive for ammonia production (approaching $400/metric ton $NH_3$ or better) without a massive release of $CO_2$ from steam reformation. Heating costs will vary depending on the electrolyte and process used and can be expected to add approximately 20% of the electricity cost for the electrolytic process. Temperature and pressure requirements and capital equipment investment costs are expected to be significantly lower than that of the Haber Bosch process, and distribution costs may be mitigated as previously described. This process can provide efficient ammonia production with decreased environmental impact for crop fertilization, as well as ammonia production as a feasible option for chemical energy storage as a liquid fuel, which may be useful in ammonia fuel cell transportation systems or grid scale energy storage systems among other chemical energy storage applications.

Figure 5:
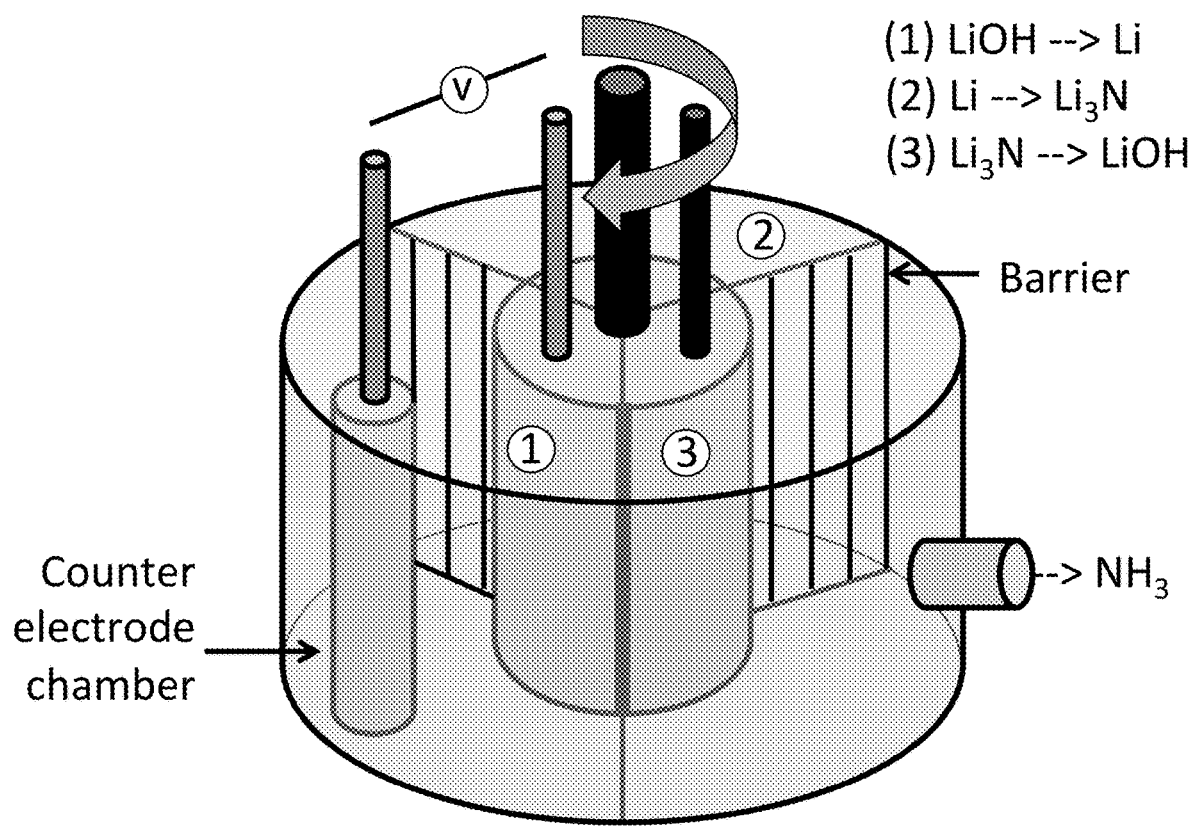
FIG. 5. shows a continuous cycle device, according to one embodiment of the current invention.

In another aspect of the invention, the reaction chamber further includes a diffusion barrier disposed between the anode and the cathode. Here, the reaction chamber includes a cylindrical reaction chamber that is divided into three sub-chambers, where the anode and the cathode are separated by the diffusion barrier, where the three sub-chambers rotate about a central axis of the cylindrical reaction chamber, where the ammonia output port is positioned on a sidewall of the cylindrical reaction chamber. FIG. 5. Shows a continuous cycle device, according to one embodiment of the current invention. In this schematic drawing, the three steps of the cycle are portrayed in three distinct chambers with barriers between chambers to facilitate continuous operation. The roll in the middle acts as a segmented working electrode to plate molten Li in step one, a thin film platform for nitridation of Li in step 2, and a reaction platform for $Li_3N$ hydrolysis and ammonia production in step 3, which may return to step 1 as a fresh electrode surface to continue the cycle. According to one embodiment, the barrier can be thin and separate the Li from the salt upon roll rotation. In one aspect recycled LiOH can be added to the counter electrode. In another aspect of the invention, the reaction chamber is divided into separate reaction chambers that include the reaction chamber containing said electrolyzed metal, the reaction chamber containing the metal-nitrogen compound, and the reaction chamber containing the ammonia.

The current invention demonstrates a novel electrochemical cycling strategy with unprecedented current efficiency and selectivity for ammonia production from reagents of only water, nitrogen, and electricity. While conventional ammonia synthesis requires high pressure infrastructure, centralization with distribution, and fossil fuels with high $CO_2$ emissions, this cycling strategy provides the basis for a sustainable alternative path among limited-to-no options for amenability of renewably powered, potentially localized ammonia production. The demonstrated process of the current invention is the unique combination of LiOH electrolysis, Li nitridation, and $Li_3N$ hydrolysis, performed in a stepwise cycle to circumvent the hydrogen evolution reaction (HER). Applying this strategy to bypass the HER represents a completely new approach to aqueous-based electrochemical ammonia synthesis, which is traditionally dominated by the HER, and this approach may be generally applicable to a variety of systems. Developing electrification and decentralization strategies such as this are important to achieving the long-term goal of process sustainability.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the to present invention as defined by the following claims and their legal equivalents.

What is claimed:

1. An electro-thermochemical cycling system for producing ammonia, comprising:
   a) a reaction chamber comprising a metal compound input port, wherein a metal compound is input to said reaction chamber through said metal compound input port;
   b) an anode and a cathode comprising an ON electrical state and an OFF electrical state, wherein said anode is in contact with said metal compound for oxidation of anions;
   c) a reactive metal formed on said cathode when said anode and said cathode are in said ON electrical state, wherein said cathode is in contact with said metal compound to reduce metal ions of said metal compound to form said reactive metal on said cathode, wherein said anode and said cathode are separated by a porous diffusion barrier disposed in said reaction chamber, wherein said porous diffusion barrier separates anodic products from said cathode and said reactive metal;
   d) a voltage source, wherein said voltage source connects said cathode to said anode to establish said electrical ON state and said electrical OFF state;
   e) a nitrogen port to said reaction chamber containing said electrolyzed reactive metal, wherein nitrogen from said nitrogen port combines with said electrolyzed reactive metal to form a metal-nitrogen compound proximal to said nitrogen input;
   f) an atomic hydrogen port to said reaction chamber containing said metal-nitrogen compound, wherein atomic hydrogen from said atomic hydrogen port combines with said metal-nitrogen compound to form ammonia; and
   g) an ammonia output port from said reaction chamber containing said ammonia, wherein said metal compound input port is configured to input said metal compound to said reaction chamber according to a depletion rate of said metal compound in said reaction chamber.

2. The electro-thermochemical cycling system for production of ammonia according to claim 1, wherein said metal compound comprises a metal selected from the group consisting of Li, Be, Mg, Na, Al, Zn, Ca, Sr, and Ba.

3. The electro-thermochemical cycling system for production of ammonia according to claim 2, wherein said porous diffusion barrier comprises a material selected from the group consisting of alumina, magnesia, and steel.

4. The electro-thermochemical cycling system for production of ammonia according to claim 1, wherein said reaction chamber is divided into separate reaction chambers that include said reaction chamber containing said electrolyzed metal, said reaction chamber containing said metal-nitrogen compound, and said reaction chamber containing said ammonia.

5. The electro-thermochemical cycling system for production of ammonia according to claim 1, wherein said cathode comprises a material selected from the group consisting of steel, Ni, Cu, Ti, Mo, and graphite.

6. The electro-thermochemical cycling system for production of ammonia according to claim 1, wherein said anode comprises a material selected from the group consisting of steel, Ni, Pt, W, metal alloys, metal oxides, and graphite.

7. The electro-thermochemical cycling system for production of ammonia according to claim 1, wherein said metal compound comprises a molten metal compound and an additive for reducing the melting point of said molten metal compound mixture, reducing the melting point of said molten metal compound and dissolving said metal compound, or dissolving said metal compound contained in said reaction chamber.

8. The electro-thermochemical cycling system for production of ammonia according to claim 7, wherein said additive comprises LiCl, KCl, CsCl, RbCl, LiI or alkali earth metal compounds for decreased melting point and removing hydrogen, oxygen, or hydroxide sources from said cathode, or removing hydrogen, oxygen, or hydroxide sources from said cathode.

9. The electro-thermochemical cycling system for production of ammonia according to claim 1, wherein said atomic hydrogen is selected from the group consisting of water, ethanol, hydrogen, and HCl.

10. The electro-thermochemical cycling system for production of ammonia according to claim 1, wherein anode oxidation source is selected from the group consisting of OH, Cl, Br, I, and F.

11. The electro-thermochemical cycling system for production of ammonia according to claim 1, wherein said reaction chamber comprises a cylindrical reaction chamber that is divided into three sub-chambers, wherein said anode and said cathode are separated by said diffusion barrier, wherein said three sub-chambers rotate about a central axis of said cylindrical reaction chamber, wherein said ammonia output port is positioned on a sidewall of said cylindrical reaction chamber.

* * * * *